US012734943B2

(12) United States Patent
Yoshiga et al.

(10) Patent No.: US 12,734,943 B2
(45) Date of Patent: Sep. 15, 2026

(54) VEHICLE SEAT

(71) Applicants: NHK SPRING CO., LTD., Yokohama (JP); SUBARU CORPORATION, Tokyo (JP)

(72) Inventors: Kensuke Yoshiga, Yokohama (JP); Hiroki Jineda, Yokohama (JP); Kenji Nagumo, Tokyo (JP); Fumito Kitanaka, Tokyo (JP); Mitsutoshi Saito, Tokyo (JP)

(73) Assignees: NHK Spring Co., Ltd., Yokohama (JP); SUBARU CORPORATION, Tokyo (JP)

( * ) Notice: Subject to any disclaimer, the term of this patent is extended or adjusted under 35 U.S.C. 154(b) by 373 days.

(21) Appl. No.: 18/542,443

(22) Filed: Dec. 15, 2023

(65) Prior Publication Data

US 2024/0198873 A1 Jun. 20, 2024

(30) Foreign Application Priority Data

Dec. 20, 2022 (JP) ................................ 2022-203367

(51) Int. Cl.
*B60N 2/58* (2006.01)
*B60N 2/64* (2006.01)
*B60N 2/12* (2006.01)

(52) U.S. Cl.
CPC . *B60N 2/58* (2013.01); *B60N 2/12* (2013.01)

(58) Field of Classification Search
CPC ...... B60N 2/6009; B60N 2/60; B60N 2/5891; B60N 2/58
See application file for complete search history.

(56) References Cited

U.S. PATENT DOCUMENTS 10,308,203 B2 * 6/2019 Matusko .................. B60N 2/24
10,486,566 B2 * 11/2019 Namboodiri ......... B60N 2/3065
10,668,839 B2 * 6/2020 Rylance ............... B60N 2/5891
2014/0197942 A1 7/2014 Tabaczynski et al.

(Continued)

FOREIGN PATENT DOCUMENTS

JP 2016-506888 A 3/2016
JP B 6151899 6/2017

OTHER PUBLICATIONS

Office Action issued in Japanese Application No. 2022-203367, dated Feb. 10, 2026.

*Primary Examiner* — Shin H Kim
(74) *Attorney, Agent, or Firm* — Knobbe, Martens, Olson & Bear, LLP

(57) ABSTRACT

A vehicle seat includes: a seat cushion frame; a seat back frame; a routing member extending from a rear face side of a seat back to a lower side of a seat cushion; a screen member provided extending from the rear face side of the seat back to the lower side of the seat cushion. The screen member includes: a main body portion disposed at a lower side of a rear face of the seat back, and a projecting portion projecting from the main body portion and disposed at the lower side of the seat cushion; and a resilient member, one end, in a length direction, of the resilient member being attached to the projecting portion, at which the main body portion is disposed, another end of the resilient member being attached to the seat cushion frame, and the resilient member being extensible in accordance with a tilting action of the seat back.

5 Claims, 6 Drawing Sheets

(56) References Cited

U.S. PATENT DOCUMENTS

| | | | | |
|---|---|---|---|---|
| 2019/0143859 | A1* | 5/2019 | Sakoda | A47C 31/02 297/218.1 |
| 2019/0184882 | A1* | 6/2019 | Siegmann | B60N 2/1665 |
| 2019/0210485 | A1* | 7/2019 | Tsukamoto | B60N 2/986 |
| 2019/0232836 | A1* | 8/2019 | Rylance | B60N 2/64 |
| 2024/0198873 | A1* | 6/2024 | Yoshiga | B60N 2/58 |

* cited by examiner 56
66
44
64A
P
42
68
58
50
70
Q
52
34
62
60
64
64C
64D
44A
42A
40
26
36
54
36
30
30
38
24
32
46
FR
RH 60
62
62A
62B
62B
64B
64
68
68E
64D
68C
68D
Q
70
64A
66D
66C
64C
66E
66
66A
68A
66B
68B
UP
RH
FR

VEHICLE SEAT

CROSS-REFERENCE TO RELATED APPLICATION

This application claims priority under 35 USC 119 from Japanese Patent Application No. 2022-203367 filed Dec. 20, 2022, the disclosure of which is incorporated by reference herein in its entirety.

BACKGROUND

Technical Field

The present disclosure relates to a vehicle seat.

Related Art

As an example, Japanese Patent No. 6,151,899 discloses a technology in which a vehicle seat is equipped with a cover mechanism (a screen member) at a lower end portion of a backboard that structures a rear face of a seat back. In this related technology, the cover mechanism suppresses visibility of structural objects in a seat cushion during a reclining action of the seat back.

The cover mechanism is equipped with a fixed cover, a movable cover and an urging member. The movable cover is moved relative to the fixed cover by an urging force of the urging member, enabling the movable member to track the reclining action of the seat back.

SUMMARY

However, this related technology has a large number of components and increases a number of work operations, correspondingly increasing costs.

In consideration of the circumstances described above, the present disclosure provides a vehicle seat that may, with a simple structure, suppress slackness of a screen member caused by a reclining action and that may improve appearance.

A vehicle seat according to a first aspect includes: a seat cushion frame that structures a framework of a seat cushion and that seat a vehicle occupant; a seat back frame that structures a framework of a seat back, the seat back being tiltably coupled to the seat cushion and supporting an upper body of a vehicle occupant seated on the seat cushion; a routing member routed extending from a rear face side of the seat back to a lower side of the seat cushion; a sheet shaped screen member provided extending from the rear face side of the seat back to the lower side of the seat cushion and screening the routing member from a vehicle cabin interior side, the screen member including a main body portion that is disposed at a lower side of a rear face of the seat back and a projecting portion that projects from the main body portion and that is disposed at the lower side of the seat cushion; and a resilient member formed in an elongated shape, one end portion, in a length direction, of the resilient member being attached to the projecting portion at a side thereof at which the main body portion is disposed, another end portion, in the length direction, of the resilient member being attached to the seat cushion frame, and the resilient member being extensible in accordance with a tilting action of the seat back.

The vehicle seat according to the first aspect includes the seat cushion frame, the seat back frame, the routing member, the screen member and the resilient member. The seat cushion frame structures the framework of the seat cushion. The seat back frame structures the framework of the seat back and is tiltably coupled to the seat cushion.

The routing member is routed extending from the rear face side of the seat back to the lower side of the seat cushion. The sheet shaped screen member is formed is provided extending from the rear face side of the seat back to the lower side of the seat cushion. The screen member screens the routing member from the cabin interior side.

The screen member includes the main body portion and the projecting portion. The main body portion is disposed at the rear face and lower side of the seat back. The projecting portion projects from the main body portion and is disposed at the lower side of the seat cushion.

The resilient member is formed in an elongated shape. The one end portion, in the length direction, of the resilient member is attached to the projecting portion of the screen member at the side thereof at which the main body portion is disposed. The other end portion, in the length direction, of the resilient member is attached to the seat cushion frame. As a result, the resilient member may extend in accordance with a tilting action of the seat back.

In the event that slackness of the screen member is large in a state in which the seat back was reclined, internal objects would be visible and appearance would be poor. In the present aspect, because the resilient member that is extensible in accordance with a tilting action of the seat back is employed, slackness of the routing member and screen member caused by the tilting of the seat back may be suppressed. Harnesses, wires, cables and the like can be mentioned as examples of the routing member.

In the present aspect, the one end portion, in the length direction, of the resilient member is attached to the projecting portion of the screen member at the side thereof at which the main body portion is disposed. That is, the one end portion side, in the length direction, of the resilient member and the projecting portion of the screen member are in an overlapped state. The projecting portion is disposed at the lower side of the seat cushion. Thus, because the projecting portion and the resilient member are overlapped, slackness of the routing member and the screen member due to the weight of the routing member and the screen member may be braced by the resilient member, and slackness of the routing member and screen member may be efficiently suppressed.

As a comparative example, if, for example, one end portion, in a length direction, of a resilient member is attached to a front end portion of a screen member (a distal end of a projecting portion), the length of the resilient member itself is shorter than in the present aspect. Because a load acting on the resilient member is substantially the same, a weight (urging force) per unit length of the resilient member in the comparative example is larger in correspondence with an amount by which the length of the resilient member is shorter than the resilient member of the present aspect. Deterioration of the resilient member over time progresses correspondingly and the lifetime is shorter.

That is, in the present aspect, in comparison with a structure in which the one end portion, in the length direction, of the resilient member is attached to the front end portion of the screen member, the load per unit length is smaller in correspondence with an amount by which the length of the resilient member is longer. Thus, the progress of deterioration of the resilient member over time may be suppressed correspondingly and the lifetime of the resilient member may be lengthened.

In a vehicle seat according to a second aspect, in the vehicle seat according to the first aspect, a cross portion is formed at the resilient member, at which cross portion a pair of the resilient members respectively intersects a reference line along a seat front-rear direction, and an intersection point of the pair of the resilient members at the cross portion overlaps with the projecting portion in plan view.

In the vehicle seat according to the second aspect, the cross portion is formed at the pair of the resilient members. At the cross portion, the pair of the resilient members respectively intersect with the reference line along the seat front-rear direction. The intersection point of the pair of the resilient members at the cross portion is overlapped with the projecting portion in plan view.

As a comparative example, if, for example, a pair of resilient members are attached (at attachment portions) to a front end portion of a screen member, in a state in which this pair of resilient members are crossed to each other, a cross portion is formed at a location that is not overlapped with the screen member in plan view.

In this structure, respective force components caused by resilient forces of the pair of resilient members act on the attachment portions towards inner sides in the seat width direction. As a result, the attachment portions may become closer together and slackness in the seat width direction may occur at the front end portion of the screen member. When slackness in the seat width direction occurs at the front end portion of the screen member in this manner, the appearance is degraded.

In the present aspect, by contrast, the resilient members are specified as described above such that the intersection point of the resilient members at the cross portion is overlapped with the projecting portion in plan view. Therefore, at the front end portion of the screen member of the present aspect, force components caused by resilient forces of the pair of resilient members act towards outer sides in the seat width direction. As a result, slackness in the seat width direction at the front end portion of the screen member is suppressed, and the appearance may be improved with a simple structure.

Because the resilient members are crossed such that the intersection point of the resilient members at the cross portion is overlapped with the projecting portion of the screen member in plan view, slackness due to the weight of the routing member and the screen member may be braced by the resilient members, and slackness of the routing member and screen member may be efficiently suppressed.

In a vehicle seat according to a third aspect, in the vehicle seat according to the second aspect, the resilient members include a pair of side portions at respective outer sides, in a seat width direction, of the cross portion, the side portions being arranged along the seat front-rear direction, and the side portions partly overlapping with the projecting portion in plan view.

In the vehicle seat according to the third aspect, the resilient members are provided with the pair of side portions separately from the cross portion. The pair of side portions are arranged along the seat front-rear direction at respective outer sides, in the seat width direction, of the cross portion. The side portions are specified such that parts of the side portions are overlapped with the projecting portion in plan view. In the present aspect, slackness due to the weight of the routing member and the screen member may be braced by the cross portion and pair of side portions of the resilient members. Therefore, slackness of the routing member and screen member may be more reliably suppressed.

In a vehicle seat according to a fourth aspect, in the vehicle seat according to the third aspect, in an upright state of the seat back, the pair of side portions overlap with corner portions at respective end portions, in the seat width direction, of the seat front side of the projecting portion in plan view.

In the vehicle seat according to the fourth aspect, the pair of side portions are specified so as to overlap, in plan view, with the corner portions at respective end portions, in the seat width direction, of the front side of the projecting portion, in the upright state (initial state) of the seat back. Therefore, the corner portions at respective end portions, in the seat width direction, of the projecting portion are braced by the pair of side portions. As a result, sagging by the corner portions of the projecting portion may be suppressed, and the appearance may be further improved. The meaning of the term "corner portion" as used herein is intended to include vicinity portions including a corner (an intersection point at which two lines intersect).

When the seat back tilts, the projecting portion moves to the front side in the seat front-rear direction. In this situation, the pair of side portions brace each of two side portions of the projecting portion, and the corner portions of the projecting portions are disposed between the side portions and linear portions that structure portions of the cross portion of the resilient members. Thus, the corner portions of the projecting portion are braced by the linear portions and the side portions of the resilient members. Therefore, the state in which sagging of the corner portions of the projecting portion is suppressed may be maintained.

In a vehicle seat according to a fifth aspect, in the vehicle seat according to the fourth aspects, the resilient members include a pair of rubber members, one of the pair of the rubber members is formed as an integrated body having one side part of the cross portion and one of the pair of the side portions, and another of the pair of the rubber members is formed as an integrated body having another side part of the cross portion and another of the pair of the side portions.

In the vehicle seat according to the disclosure of the fifth aspect, the resilient members are structured by the two rubber members. One of the rubber members is formed as the integrated body having the one side part of the cross portion and one of the pair of the side portions. Accordingly, a first apex portion of the one rubber member is formed by the one side part of the cross portion and the one of the pair of the side portions. This first apex portion is attached to the seat cushion frame.

The other of the rubber members is formed as an integrated body of the other side part of the cross portion and the other of the pair of the side portions. Accordingly, a second apex portion of the other rubber member is formed by the other side part of the cross portion and the other of the pair of the side portions. This second apex portion is attached to the seat cushion frame.

As described above, in the vehicle seat according to the present disclosure, slackness of a screen member caused by a reclining action may be suppressed with a simple structure, in addition to which appearance may be improved.

DETAILED DESCRIPTION

Figure 1:
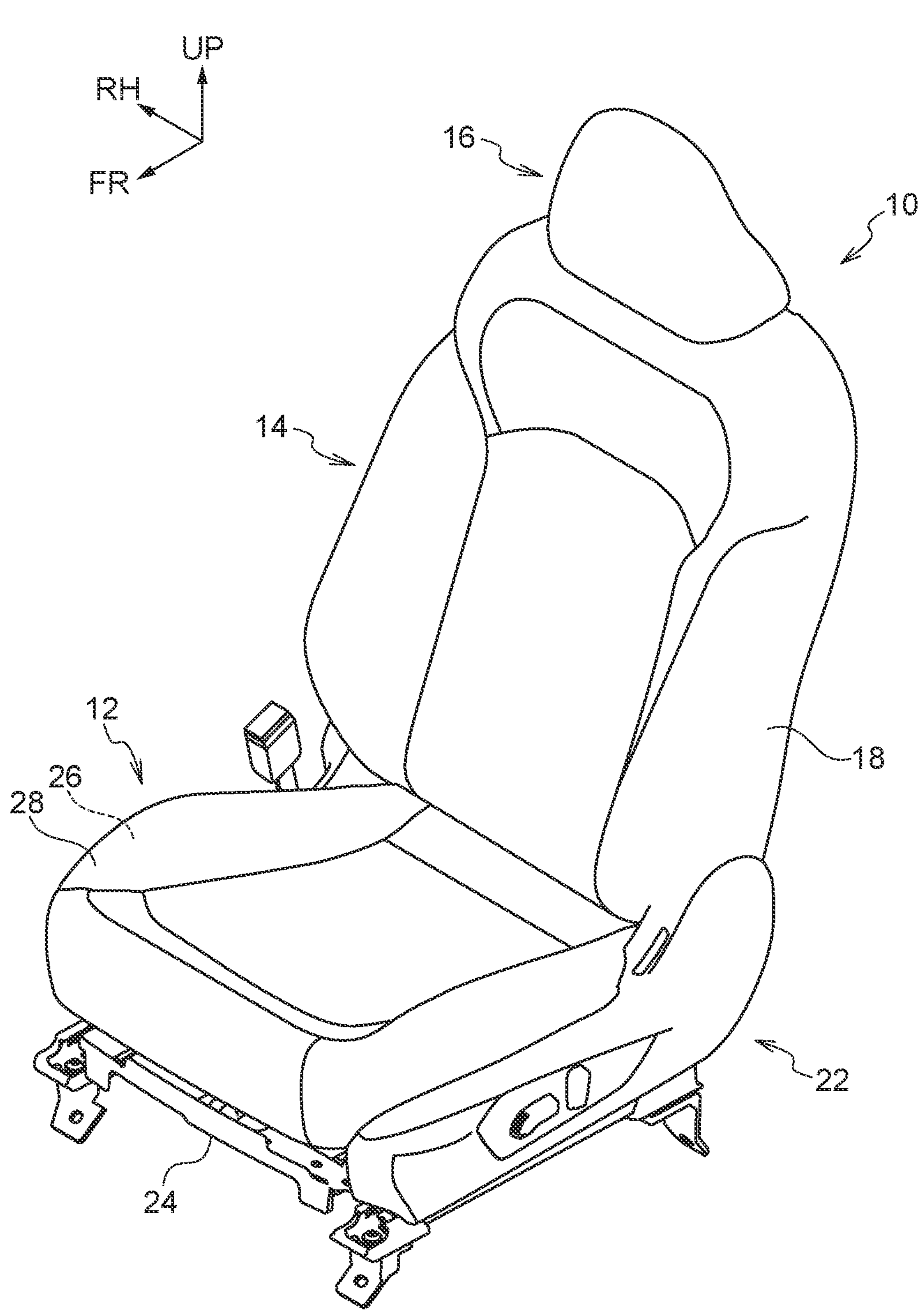
FIG. 1 is a perspective view in which a vehicle seat according to a present exemplary embodiment is seen diagonally from a front-right side.

A vehicle seat 10 according to an exemplary embodiment of the present disclosure is described using the attached drawings. The arrow FR, arrow RH and arrow UP that are shown where appropriate in the drawings indicate, respectively, a front direction, right direction and upper direction of the vehicle seat 10. In the present exemplary embodiment, front, rear, left, right, upper and lower directions of the vehicle seat 10 match front, rear, left, right, upper and lower directions of a vehicle (a car) in which the vehicle seat 10 is installed. When descriptions are given simply using the front, rear, left, right, upper and lower directions, these represent front and rear in the seat front-rear direction, left and right in the seat left-right direction (seat width direction), and upper and lower in the seat vertical direction.

—Structure of the Vehicle Seat—

First, structures of the vehicle seat 10 according to the present exemplary embodiment are described.

As shown in FIG. 1, the vehicle seat 10 includes a seat cushion 12, a seat back 14 and a head rest 16. The seat cushion 12 supports the thigh area and buttock area of a seated vehicle occupant. The seat back 14 is provided at the rear end side of the seat cushion 12 and supports the upper body of the seated vehicle occupant. The head rest 16 supports the head area of the seated vehicle occupant.

The seat back 14 is provided with a seat back frame, which is a framework member that is not shown in the drawings, a seat back pad, which is a pad material that is not shown in the drawings, and a seat back cover 18 that covers the seat back pad.

Figure 5:
FIG. 5 is a side view showing principal portions, for describing the upright state of the seat back of the vehicle seat according to the present exemplary embodiment.
Figure 5:
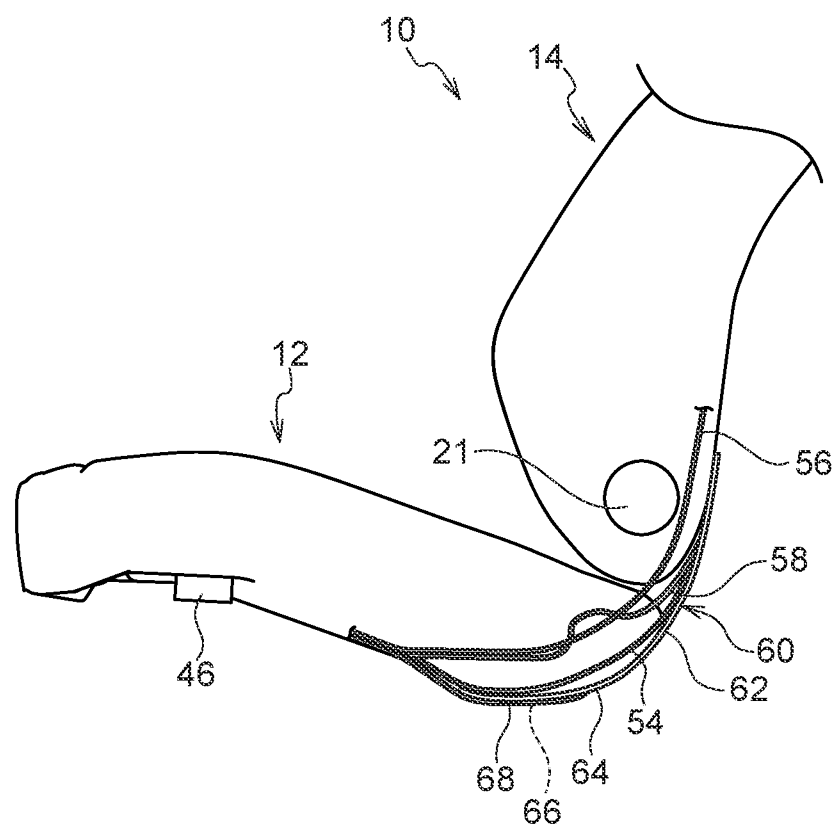
Figure 6:
FIG. 6 is a side view showing principal portions, for describing a reclined state of the seat back of the vehicle seat according to the present exemplary embodiment.
Figure 6:
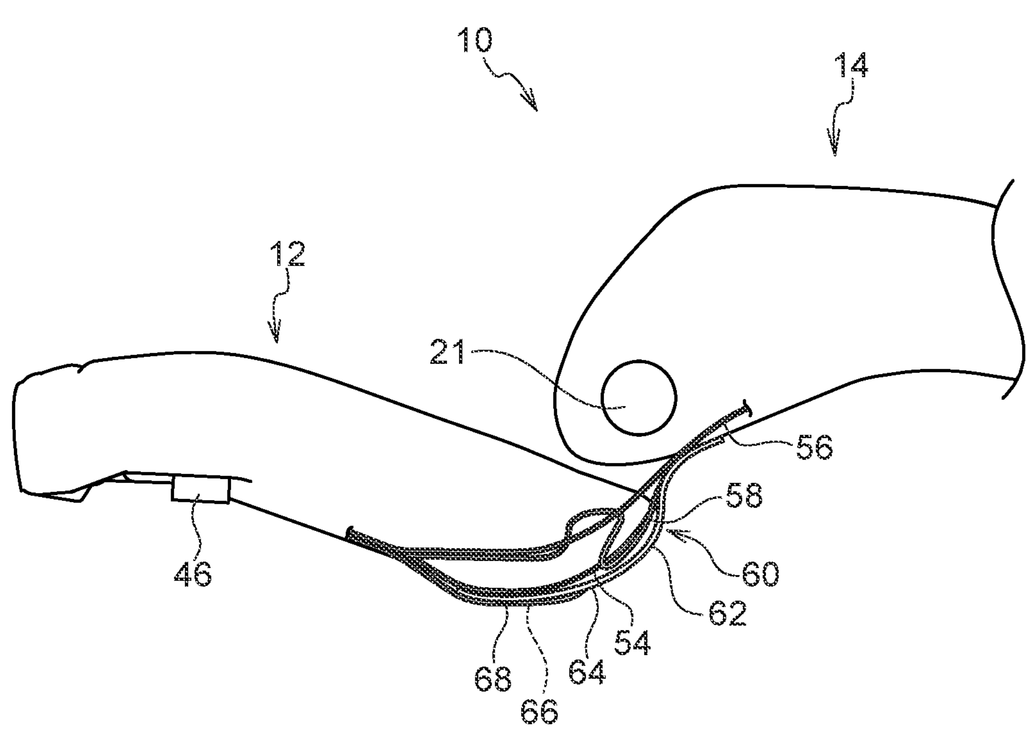

An axial portion 21 (see FIG. 5) is provided at a lower end portion of the seat back frame. The axial portion 21 is arranged along the seat width direction. As illustrated in FIG. 5 and FIG. 6, the seat back 14 is capable of reclining (tilting) relative to the seat cushion 12 by the seat back frame being turned around the axial portion 21 by a reclining mechanism 22.

Similarly to the seat back 14, the seat cushion 12 shown in FIG. 1 is provided with a seat cushion frame 24 that is a framework member, a seat cushion pad 26 that is a cushion material, and a seat cushion cover 28 that covers surfaces of the seat cushion pad 26.

Figure 3:
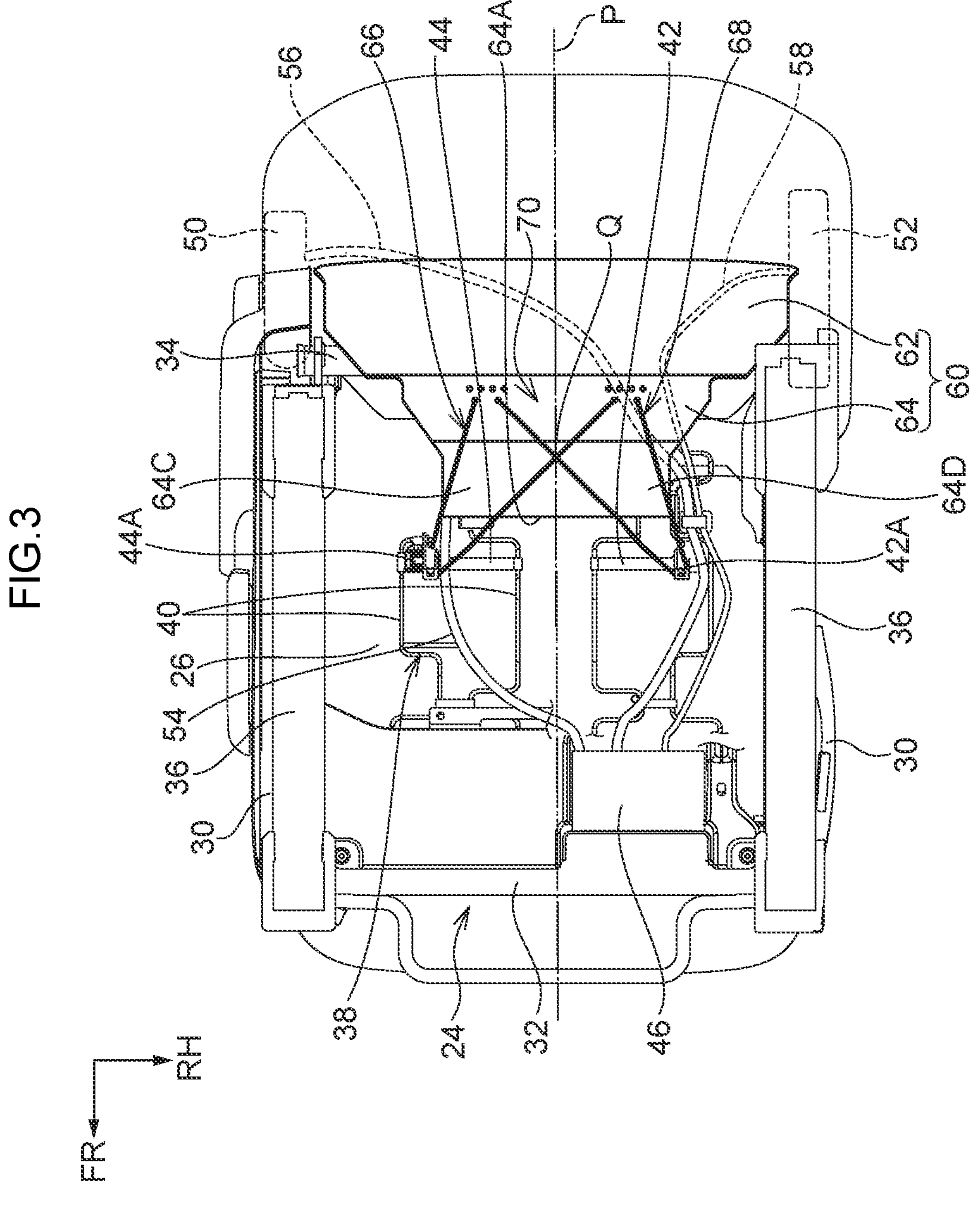
FIG. 3 is a bottom view in which the vehicle seat according to the present exemplary embodiment is seen from the lower side, which is a bottom view showing a state in which a seat back of the vehicle seat according to the present exemplary embodiment is upright.

As shown in FIG. 3, the seat cushion frame 24 includes a left and right pair of side frames 30, a front frame 32 and a rear frame 34. The side frames 30 extend in the seat front-rear direction at left and right sides of the seat cushion 12. The front frame 32 links front portions of the left and right side frames 30 in the seat width direction. The rear frame 34 links rear end portions of the left and right side frames 30 in the seat width direction.

The left and right side frames 30 and the front frame 32 are constituted of, for example, metal plate, and the rear frame 34 is constituted of, for example, metal pipe. The left and right side frames 30 are connected with a vehicle body floor portion, which is not shown in the drawings, via left and right slide rails 36 and the like.

Cushion springs 38 span between the front frame 32 and the rear frame 34. The cushion springs 38 are constituted of a plural number (four in this exemplary embodiment) of S-springs 40 that are arrayed in the seat width direction.

The S-springs 40 are constituted of wires that are bent substantially in waveform shapes (shapes similar to successive plural “S” figures). The S-springs 40 that are adjacent with one another to left and right in the seat width direction are respectively linked by flat wires 42 and 44. The S-springs 40 and such maintain the posture of a seated vehicle occupant and assure comfort performance.

A plate-shaped cushion pan may be employed instead of the cushion springs 38 that are constituted of these S-springs 40.

Figure 2:
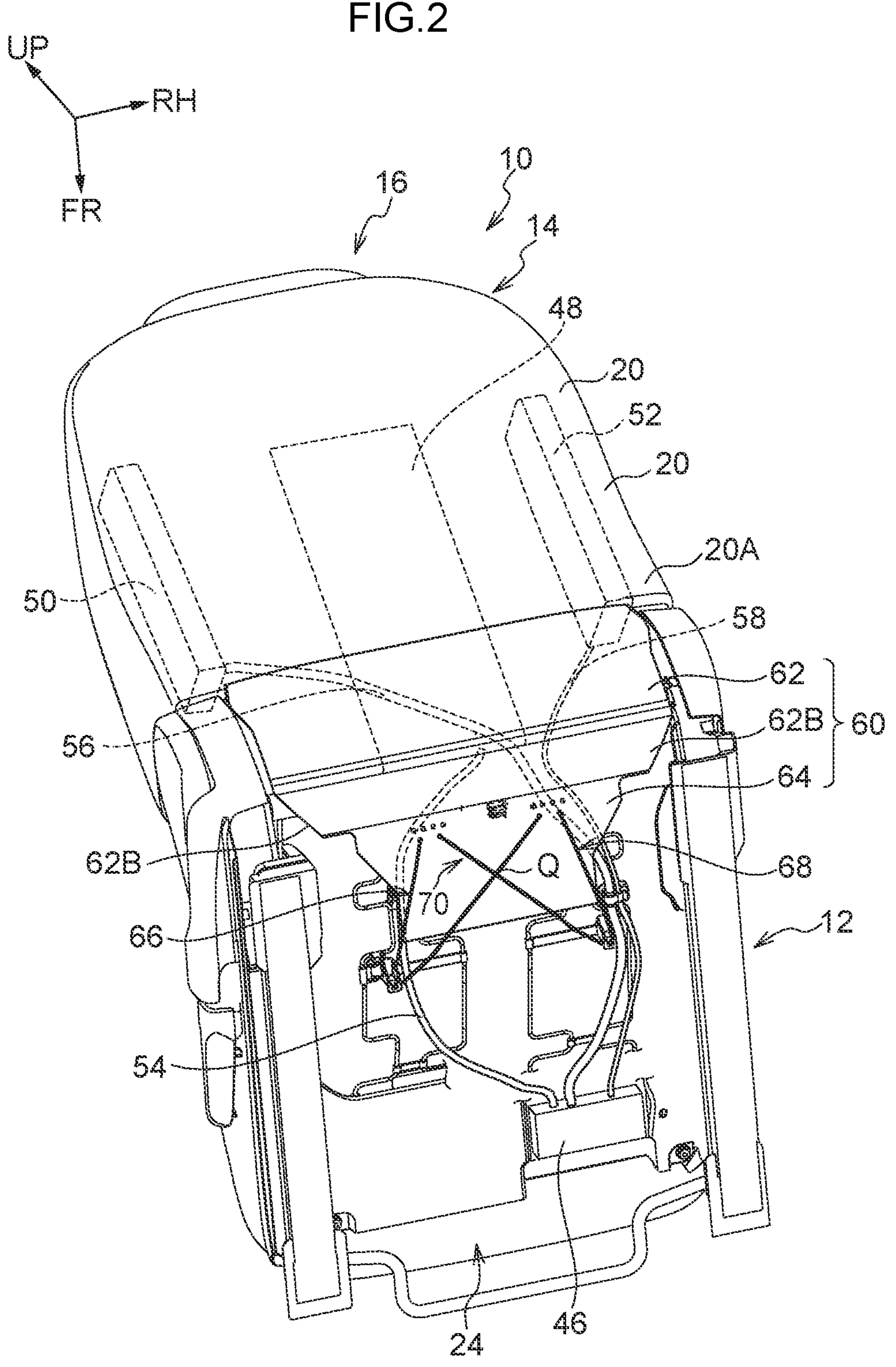
FIG. 2 is a perspective view in which the vehicle seat according to the present exemplary embodiment is seen diagonally from the lower side of the rear-left side.

In the present exemplary embodiment, as shown in FIG. 2, a coupler 46 for feeding an electric power supply is disposed at the seat cushion frame 24. Devices such as a heater 48, side airbags 50 and 52, and so forth are disposed at the seat back 14. To supply electric power to these devices, the devices are connected to the coupler 46 via harnesses 54, 56 and 58.

Thus, the harnesses 54, 56 and 58 are connected to the coupler 46 disposed at the seat cushion 12 side and to the devices disposed at the seat back 14 side. The harnesses 54, 56 and 58 are routed extending from the seat cushion 12 side to the seat back 14 side.

A rear skirt (a screen member) 60 that is formed of, for example, a carpet material, is provided at a lower end portion 20A of the seat back cover 18. The harnesses 54, 56 and 58 and so forth are screened by the rear skirt 60 from a cabin interior side thereof.

It is sufficient that the material of the rear skirt 60 has a required stiffness. Therefore, the material of the rear skirt 60 is not limited to a carpet material; leather or the like or an alternative material may be employed. Further, beside harnesses, wires, cables and the like may be employed.

The rear skirt 60 includes a main body portion 62 and a projecting portion 64, which projects from the main body portion 62. The main body portion 62 is disposed at the rear face side of the seat back 14 and at a lower side of the seat back 14. The projecting portion 64 is disposed at the lower side of the seat cushion 12.

In other words, the rear skirt 60 is an integrated body of the main body portion 62 and the projecting portion 64, and is provided extending from the rear face side of the seat back 14 to the lower side of the seat cushion 12. The harnesses 54, 56 and 58 and so forth are screened from the cabin interior side by this rear skirt 60.

Figure 4:
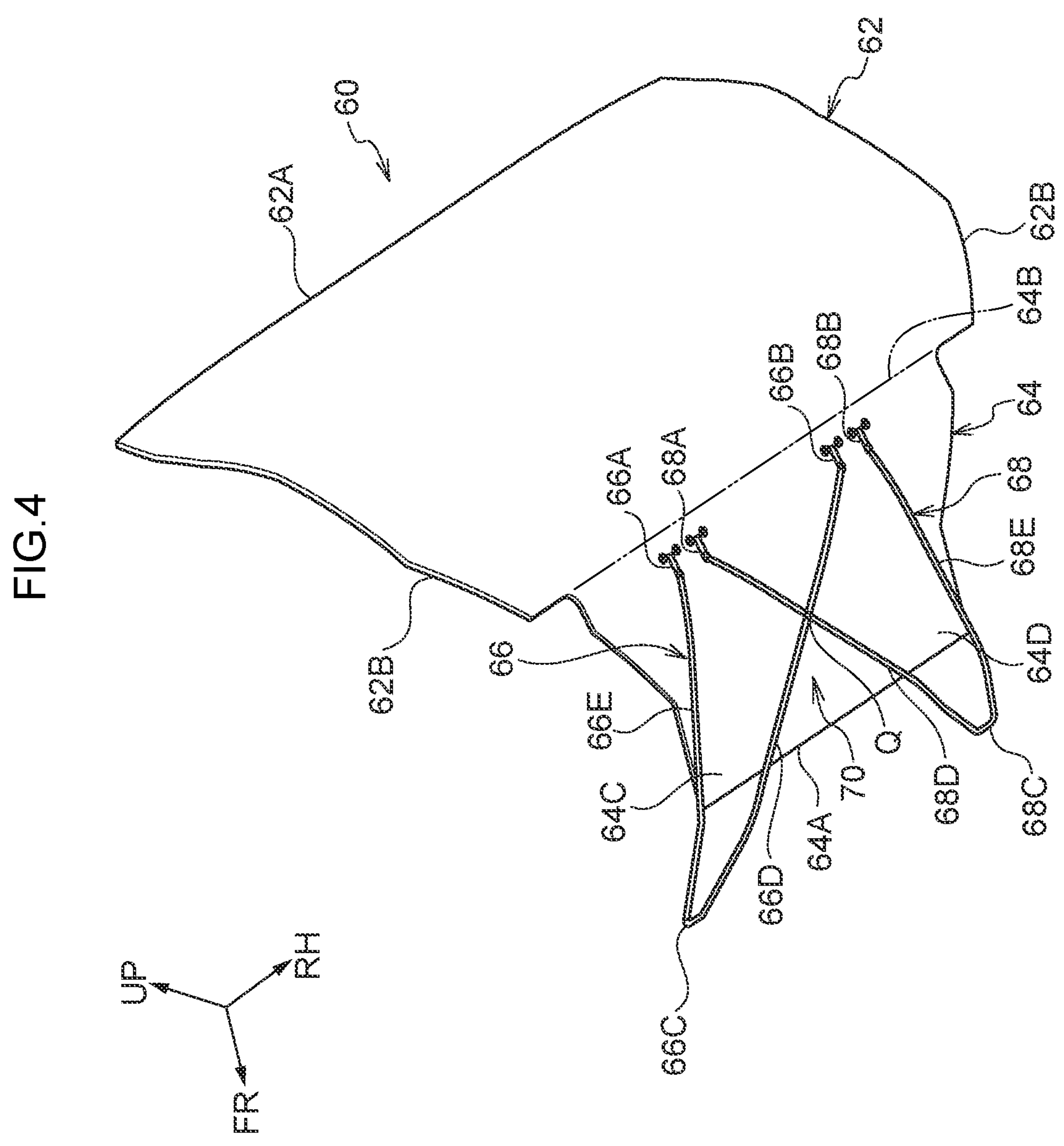
FIG. 4 is a perspective view in which a screen member structuring a portion of the vehicle seat according to the present exemplary embodiment is seen diagonally from the lower side of the rear-left side.

To describe this rear skirt 60 more specifically, as shown in FIG. 2 and FIG. 4, the main body portion 62 is formed in a substantially rectangular shape in a rear view of the vehicle seat 10. An upper end 62A of the main body portion 62 (one end of the rear skirt 60) is stitched to the lower end portion 20A of the seat back cover 20.

A trim portion 62B in a chamfer shape is formed at the side of the main body portion 62 at which the projecting portion 64 is disposed. The trim portion 62B is specified so as to avoid interference with other components when the seat back 14 is reclining (tilting) relative to the seat cushion 12.

The projecting portion 64 is formed in a substantially trapezoid shape in a bottom view of the vehicle seat 10. A lower base 64B of the projecting portion 64 is formed at a side thereof at which the main body portion 62 is disposed. At the side of the projecting portion 64 at which the lower base 64B is disposed, the projecting portion 64 is formed with a smaller dimension in the seat width direction than the main body portion 62. At a side of the projecting portion 64 at which an upper base 64A (the front end of the rear skirt 60) is formed, the projecting portion 64 is formed with a smaller dimension in the seat width direction than at the side at which the lower base 64B is disposed. Because plural components are disposed at the side of the projecting portion 64 at which the seat cushion 12 is disposed, the projecting portion 64 is formed with these short dimensions in the seat width direction so as to avoid interference with these components.

As shown in FIG. 4, left and right pair of rubber members (resilient members) 66 and 68, in the seat width direction, have long and thin shapes. Length direction respective end portions 66A, 66B, 68A and 68B of the rubber members 66 and 68 are stitched to the projecting portion 64 at the side thereof at which the lower base 64B is disposed (the side at which the main body portion 62 is disposed). Length direction middle portions 66C and 68C of the rubber members 66 and 68 are respectively anchored at the seat cushion frame 24 side. That is, the respective end portions 66A, 66B, 68A and 68B of the rubber members 66 and 68 according to the present exemplary embodiment are each equivalent to one end portion, in a length direction, of a resilient member recited in claim 1, and the middle portions 66C and 68C of the rubber members 66 and 68 are each equivalent to another end portion, in the length direction, of the resilient member recited in claim 1.

To describe the rubber members 66 and 68 more specifically, one end portion 66A, in the length direction, of the rubber member 66 is stitched to the left side of the projecting portion 64, and another end portion 66B is stitched to the right side of the projecting portion 64. The middle portion 66C, in the length direction, of the rubber member 66, as shown in FIG. 3, is anchored at an anchor portion 44A provided at the flat wire 44 that is attached to the S-spring 40 at the left side of the seat cushion frame 24. Thus, as shown in FIG. 4, the rubber member 66 is formed in a triangular shape that extends to the left and right of the projecting portion 64 with the middle portion 66C as an apex portion.

Meanwhile, one end portion 68A of the rubber member 68 is stitched to the left side of the projecting portion 64, and another end portion 68B is stitched to the right side of the projecting portion 64. The middle portion 68C, in the length direction, of the rubber member 68, as shown in FIG. 3, is anchored at an anchor portion 42A provided at the flat wire 42 that is attached to the S-spring 40 at the right side of the seat cushion frame 24 (see FIG. 3). Thus, as shown in FIG. 4, the rubber member 68 is formed in a triangular shape that extends to the left and right of the projecting portion 64 with the middle portion 68C as an apex portion.

In the present exemplary embodiment, a cross portion 70 is formed at the rubber member 66 and the rubber member 68. The cross portion intersects with a reference line P along the seat front-rear direction (see FIG. 3). The cross portion 70 is specified such that an intersection point Q thereof is overlapped with the projecting portion 64 in plan view. A linear portion 66D of the rubber member 66 links the other end portion 66B with the middle portion 66C, and a linear portion 68D of the rubber member 68 links the other end portion 68B with the middle portion 68C. The linear portion 66D and linear portion 68D are specified so as to each be overlapped with the projecting portion 64 in plan view in the state in which the linear portion 66D and the linear portion 68D cross.

As shown in FIG. 3, the anchor portions 42A and 44A are disposed further to the seat front side than the upper base 64A of the projecting portion 64. Moreover, the anchor portions 42A and 44A are disposed further to outer sides in the seat width direction than corner portions 64C and 64D of the projecting portion 64.

A side portion 66E of the rubber member 66 is provided at the left side in the seat width direction of the cross portion 70. The side portion 66E links the one end portion 66A with the middle portion 66C. This side portion 66E is angled to the outer side in the seat width direction toward the seat front side. The side portion 66E is disposed so as to be substantially overlapped with the corner portion 64C of the projecting portion 64 in plan view.

A side portion 68E of the rubber member 68 is provided at the right side in the seat width direction of the cross portion 70. The side portion 68E links the one end portion 68A with the middle portion 68C. This side portion 68E is angled to the outer side in the seat width direction toward the seat front side. The side portion 68E is disposed so as to be substantially overlapped with the corner portion 64D of the projecting portion 64 in plan view.

In the present exemplary embodiment, the upper base 64A side of the projecting portion 64 is in an unsecured state. However, loose movements thereof are suppressed by the linear portion 66D and side portion 66E of the rubber member 66 and the linear portion 68D and side portion 68E of the rubber member 68.

As illustrated in FIG. 6, the seat back 14 may be reclined (tilted) relative to the seat cushion 12. Urging forces from the rubber member 66 and 68 are at a minimum when the seat back 14 is in a fully reclined state, and the urging forces of the rubber member 66 and 68 are specified such that the rear skirt 60 is not slack in this state.

In the present exemplary embodiment, the two rubber members 66 and 68 are employed as a resilient member. However, the cross portion 70 and the side portion 66E and side portion 68E may be formed by a single rubber member. Alternatively, four resilient members may be employed so as to form respective cross portions and side portions.

—Operation and Effects of the Vehicle Seat—

Now, operation and effects of the vehicle seat 10 according to the present exemplary embodiment are described.

In the present exemplary embodiment, as shown in FIG. 2 to FIG. 4, the vehicle seat 10 is structured to include the harnesses 54, 56 and 58, the rear skirt 60 and the rubber members 66 and 68. The harnesses 54, 56 and 58 are routed extending from the rear face side of the seat back 14 to the lower side of the seat cushion 12. The rear skirt 60 is formed in a sheet shape, is provided extending from the rear face side of the seat back 14 to the lower side of the seat cushion 12, and screens the harnesses 54, 56 and 58 from the cabin interior side.

The rear skirt 60 includes the main body portion 62 and the projecting portion 64. The main body portion 62 is disposed at the lower side of the rear side of the seat back 14, and the projecting portion 64 projects from the main body portion 62 and is disposed at the lower side of the seat cushion 12.

The rubber members 66 and 68 are formed in an elongated shapes. The one end portions 66A and 68A of the rubber members 66 and 68 are attached to the side of the projecting portion 64 of the rear skirt 60 at which the main body portion 62 is disposed. The middle portions 66C and 68C of the rubber members 66 and 68 are attached to the seat cushion frame 24. As a result, the rubber members 66 and 68 may extend in accordance with a tilting action of the seat back 14.

If slackness of the rear skirt 60 was large in a reclined state of the seat back 14, internal equipment would be visible and the appearance would be poor. In the present exemplary embodiment, because the rubber members 66 and 68 that are extensible in accordance with a tilting action of the seat back 14 are employed, slackness of the harnesses 54, 56 and 58 and the rear skirt 60 caused by the tilting of the seat back 14 may be suppressed. That is, in the present exemplary embodiment, slackening of the rear skirt 60 by a reclining action may be prevented.

In the present exemplary embodiment, the respective end portions 66A, 66B, 68A and 68B of the rubber members 66 and 68 are attached to the projecting portion 64 of the rear skirt 60 at the side thereof at which the main body portion 62 is disposed. That is, the sides of the rubber members 66 and 68 at which the respective end portions 66A, 66B, 68A and 68B are disposed are overlapped with the projecting portion 64 of the rear skirt 60.

The projecting portion 64 is disposed at the lower side of the seat cushion 12. Thus, because the projecting portion 64 and the rubber members 66 and 68 are overlapped, slackness due to the weight of the harnesses 54, 56 and 58 and the rear skirt 60 may be braced by the rubber members 66 and 68. Therefore, slackness of the harnesses 54, 56 and 58 and the rear skirt 60 may be efficiently suppressed in the present exemplary embodiment.

As a comparative example, if, for example, one end portions of the rubber members were attached to a front end portion of the rear skirt 60 (the distal end of the projecting portion), the lengths of the rubber members 66 and 68 themselves would be shorter than in the structure in which the one end portions (for example, 66A and 68B) of the rubber members 66 and 68 are attached to the projecting portion 64 at the side thereof at which the main body portion 62 is disposed. Because a load acting on the rubber members 66 and 68 would be substantially the same, a weight (urging force) per unit length in the comparative example would be larger in correspondence with an amount by which the lengths of the rubber members 66 and 68 were shorter than the rubber members 66 and 68 according to the present exemplary embodiment. Deterioration over time would progress correspondingly and the lifetime would be shorter as for the rubber members 66 and 68 in the comparative example.

That is, in the present exemplary embodiment, in comparison to a structure, which is not shown in the drawings, in which one end portions of rubber members are attached to the front end portion of the rear skirt 60, the load per unit length is smaller in correspondence with an amount by which the lengths of the rubber members 66 and 68 themselves are longer. Thus, the progress of deterioration over time may be suppressed correspondingly and the lifetime of the rubber members 66 and 68 may be lengthened.

In the present exemplary embodiment, the cross portion 70 is formed by the rubber members 66 and 68. The cross portion 70 intersects with the reference line P along the seat front-rear direction. The cross portion 70 is specified such that the intersection point Q is overlapped with the projecting portion 64 in plan view.

As a comparative example, if, for example, the one end portions 66A, and 68A of the rubber members 66 and 68 were attached to the front end portion of the rear skirt 60, and this pair of rubber members 66 and 68 were attached to the seat cushion frame 24 in a crossed state, the cross portion 70 would be formed at a location that is not overlapped with the rear skirt 60 in plan view.

In this structure, respective force components caused by the resilient forces of the rubber members 66 and 68 would act on the one end portion 66A of the rubber member 66 and the one end portion 68A of the rubber member 68, via the rubber members 66 and 68, towards the inner sides in the seat width direction. As a result, the one end portion 66A of the rubber member 66 and one end portion 68A of the rubber member 68 might become closer together and slackness in the seat width direction might occur at the front end portion of the rear skirt 60. When slackness in the seat width direction occurs at the front end portion of the rear skirt 60 in this manner, the appearance is degraded.

In the present exemplary embodiment, by contrast, the rubber members 66 and 68 are specified as described above such that the intersection point Q of the cross portion 70 is overlapped with the projecting portion 64 in plan view. Therefore, at the front end of the rear skirt 60 (the upper base 64A of the projecting portion 64), force components caused by the resilient forces of the rubber members 66 and 68 act towards the outer sides in the seat width direction via the rubber members 66 and 68. As a result, slackness in the seat width direction at the front end of the rear skirt 60 (the upper base 64A of the projecting portion 64) is suppressed, and the appearance may be improved with a simple structure.

Because the rubber members 66 and 68 are crossed such that the intersection point Q of the cross portion 70 is overlapped with the projecting portion 64 of the rear skirt 60 in plan view, slackness due to the weight of the harnesses 54, 56 and 58 and the rear skirt 60 may be braced by the rubber members 66 and 68, and slackness of the harnesses 54, 56 and 58 and rear skirt 60 may be efficiently suppressed.

In the present exemplary embodiment, the rubber members 66 and 68 are also provided with the pair of side portions 66E and 68E separate from the cross portion 70. The pair of side portions 66E and 68E are arranged along the seat front-rear direction at respective outer sides, in the seat width direction, of the cross portion 70. The side portions 66E and 68E are specified such that portions of the side portions 66E and 68E are overlapped with the projecting portion 64 in plan view.

That is, in the present exemplary embodiment, slackness due to the weight of the harnesses 54, 56 and 58 and the rear skirt 60 may be braced by the cross portion 70 and pair of side portions 66E and 68E of the rubber members 66 and 68. Therefore, slackness of the harnesses 54, 56 and 58 and rear skirt 60 may be more reliably suppressed.

In the present exemplary embodiment, the side portions 66E and 68E are specified such that portions thereof are overlapped in plan view with the corner portions 64C and 64D of the projecting portion 64 in the upright state of the seat back 14. Thus, the corner portions 64C and 64D of the projecting portion 64 are braced by the side portions 66E and 68E. Therefore, sagging by the corner portions 64C and 64D of the rear skirt 60 may be suppressed and the appearance may be further improved.

When the seat back 14 is reclined, the projecting portion 64 moves to the seat front side. In this situation, the side portions 66E and 68E brace both of the side portions of the projecting portion 64, the corner portion 64C of the projecting portion 64 is disposed between the linear portion 66D structuring a portion of the cross portion and the side portion 66E, and the corner portion 64D is disposed between the linear portion 68D and the side portion 68E. Thus, the corner portions 64C and 64D of the projecting portion 64 are braced by the respective linear portions 66D and 68D and side portions 66E and 68E. Therefore, the state in which sagging of the corner portions 64C and 64D of the projecting portion 64 is suppressed may be maintained.

In the present exemplary embodiment, the cross portion 70 is formed at the rubber members 66 and 68, but the cross portion 70 is not necessarily required. Although not shown in the drawings, the rubber members may be arranged in the seat front-rear direction, in which case there may be three of the rubber members.

An exemplary embodiment of the present disclosure is described above. However, the present disclosure is not limited by these descriptions and it will be clear that numerous modifications beyond these descriptions may be embodied within a technical scope not departing from the scope of the disclosure.

What is claimed is:

1. A vehicle seat, comprising:

a seat cushion frame structuring a framework of a seat cushion configured to seat a vehicle occupant;

a seat back frame structuring a framework of a seat back, the seat back being tiltably coupled to the seat cushion and supporting an upper body of a vehicle occupant seated on the seat cushion;

a routing member routed extending from a rear face side of the seat back to a lower side of the seat cushion;

a sheet-shaped screen member provided extending from the rear face side of the seat back to the lower side of the seat cushion and screening the routing member from a vehicle cabin interior side, the screen member including:

a main body portion that is disposed at a lower side of a rear face of the seat back, and a projecting portion that projects from the main body portion and that is disposed at the lower side of the seat cushion; and a resilient member formed in an elongated shape, one end portion, in a length direction, of the resilient member being attached to the projecting portion at a side thereof at which the main body portion is disposed, another end portion, in the length direction, of the resilient member being attached to the seat cushion frame, and the resilient member being extensible in accordance with a tilting action of the seat back.

2. The vehicle seat according to claim 1, wherein a cross portion is formed at the resilient member, at which cross portion a pair of the resilient members respectively intersect a reference line along a seat front-rear direction, and an intersection point of the pair of the resilient members at the cross portion overlaps with the projecting portion in plan view.

3. The vehicle seat according to claim 2, wherein the resilient members include a pair of side portions at respective outer sides, in a seat width direction, of the cross portion, the side portions being arranged along the seat front-rear direction, and the side portions partly overlapping with the projecting portion in plan view.

4. The vehicle seat according to claim 3 wherein, in an upright state of the seat back, the pair of side portions overlap with corner portions at respective end portions, in the seat width direction, of the seat front side of the projecting portion in plan view.

5. The vehicle seat according to claim 4, wherein:

the resilient members comprise a pair of rubber members, and one of the pair of rubber members is formed as an integrated body comprising one side part of the cross portion and one of the pair of the side portions, and another of the pair of rubber members is formed as an integrated body comprising another side part of the cross portion and another of the pair of the side portions.

* * * * *